W. T. CAREY.
TIRE.
APPLICATION FILED NOV. 14, 1914.

1,236,821.

Patented Aug. 14, 1917.
2 SHEETS—SHEET 1.

Witnesses
W. W. Bardsley
A. F. Macready

Inventor
William T. Carey
By Howard E. Barlow
Attorney

W. T. CAREY.
TIRE.
APPLICATION FILED NOV. 14, 1914.
1,236,821.
Patented Aug. 14, 1917.
2 SHEETS—SHEET 2.
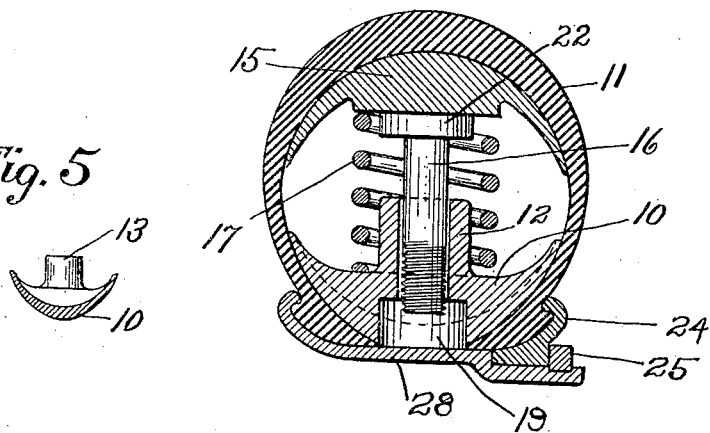
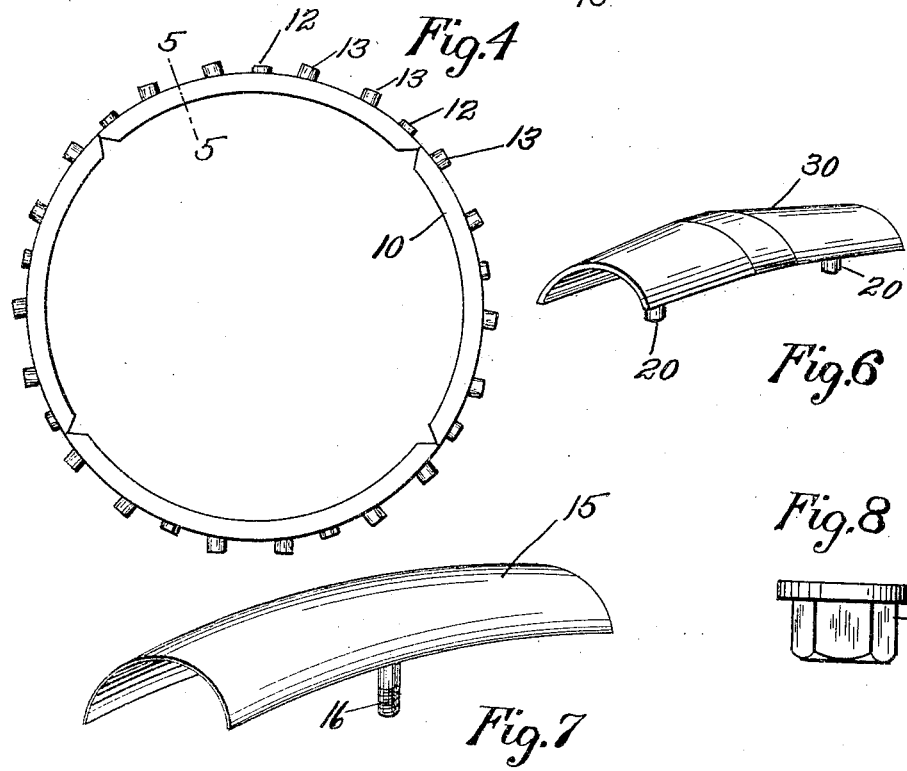
Witnesses
N. N. Bardsley.
A. F. Macready.
Inventor
William T. Carey
By Howard S. Barlow
Attorney

UNITED STATES PATENT OFFICE.

WILLIAM T. CAREY, OF CRANSTON, RHODE ISLAND.

TIRE.

1,236,821.  Specification of Letters Patent.  Patented Aug. 14, 1917.

Application filed November 14, 1914. Serial No. 872,270.

*To all whom it may concern:*

Be it known that I, WILLIAM T. CAREY, a citizen of the United States, and resident of the city of Cranston, in the county of Providence and State of Rhode Island, have invented certain new and useful Improvements in Tires, of which the following is a specification.

This invention relates to tires for vehicle wheels and has for its object to provide an outer casing, having a rim fitting thereinto and a plurality of spring pressed segments between said rim and casing yieldably pressing the latter outward forming a flexible cushion tire for supporting the vehicle.

A further object of the invention is the provision of means for contracting said segments against the spring tension and temporarily retain them in that position to facilitate the positioning in and removal from the casing.

With these and other objects in view, the invention consists of certain novel features of construction, as will be more fully described, and particularly pointed out in the appended claims.

Figure 1:
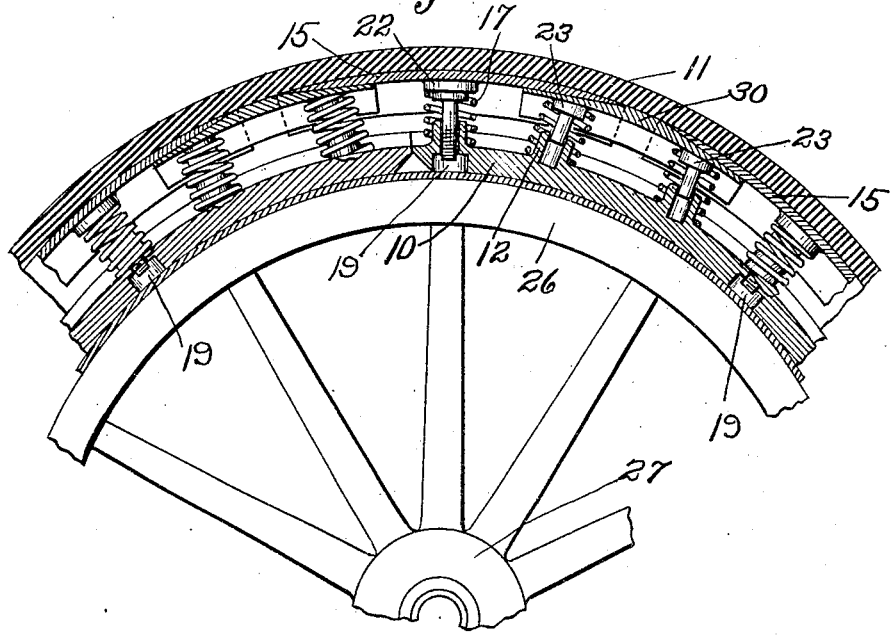

In the accompanying drawings:

Figure 1— is a longitudinal sectional view showing a portion of my improved tire, the same being mounted upon the rim of the wheel with the springs in expanded position.

Figure 2:
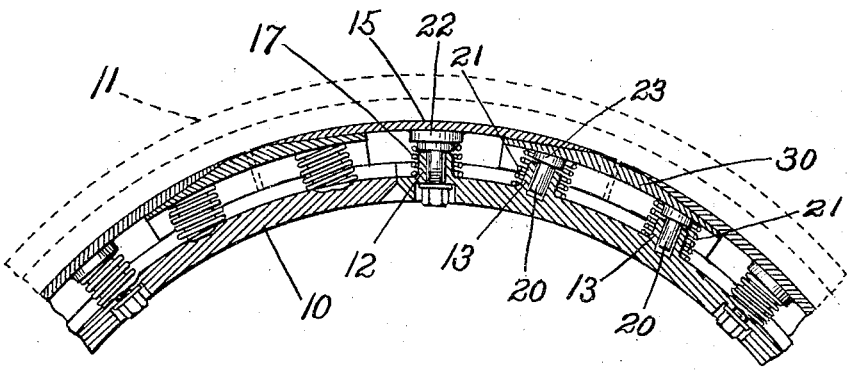

Fig. 2— shows the segments of the tire as contracted or drawn inward to facilitate positioning the same in the casing.

Fig. 3— is a transverse sectional view enlarged over views 1 and 2 showing the different parts of the tire as applied to and located in position within the outer casing.

Fig. 4— is a side elevation of the rim of my improved tire showing the same formed in segments to enable it to be placed into the casing.

Fig. 5— is a sectional view of this rim on line 5—5 of Fig. 4 showing its concavo-convex shape in cross section.

Fig. 6— is a perspective view showing one of the inner series of segments which is supported on said rim.

Fig. 7— is a perspective view of one of the outer series which is arranged to over-lap the inner series in the manner illustrated in Figs. 1 and 2.

Fig. 8— is a side elevation of the nut employed for drawing inward the spring pressed segments.

Referring to the drawings 10 designates an annular rim which may be constructed in any suitable form in cross section and of any desired material, but I preferably construct the same of a concave convex form in transverse sections as best illustrated in Figs. 3 and 5 so that this rim will take the natural shape of the ordinary tire casing 11 and by forming the rim in this shape on its inner side the stock may be formed very thin to reduce the weight of this rim. On the inner side of this rim I have provided two series of outwardly projecting bosses 12 and 13 which may be formed radially or substantially so, for the reception of the guide posts in the casing engaging segments presently described. This ring may be formed of a plurality of sections whereby it is more readily positioned in the casing.

The primary object of this invention is to do away with the pneumatic tube which is ordinarily placed in the tire casing and so avoid the trouble caused from punctures, blowouts and the like, and to accomplish this object in a simple and effective manner I provide an outer series of segments 15 which as illustrated in Fig. 7 are formed concavo-convex in cross section and each one is provided with an inwardly projecting post 16 adapted to fit into and slide freely in its respective boss 12 in the rim. The segment is normally pressed outward and held firmly against the inner surface of the casing by the coil spring 17.

When this tire is being positioned in the casing or withdrawn therefrom, it is found necessary to draw inwardly the segment and contract the springs to some extent in order to facilitate this positioning operation, and to accomplish this I have threaded the inner portion of the post 16, and provided a nut 18, see Fig. 8, which, after the casing has been removed from the wheel may be placed into the socket 19 in the rim 10 and by screwing the same up these segments are drawn inward the desired amount and held in that position as long as desired.

It is found in practice that in order to permit of the segments being drawn inwardly, they must be of a length which will necessarily cause the ends of contiguous segments to be spaced apart when the segments are in extended position. Unless such spaces are filled, the segments will soon cut and destroy the unsupported portion of the casing. To obviate this difficulty inner segments 30 are provided, which extend in under the opposite edges of the outer segments and support the ends of the same and when all the segments are expanded to their outer diameter into contact with the inner face of the casing these inner segments fill in and bridge the gap between the outer segments and form practically a continuous surface around the tire supporting the casing at all points to carry the weight as the wheel rotates.

These inner segments are also provided with posts 20 which enter their respective bosses 13 and are arranged to assist in the support of the outer segments by their coil springs 21.

It is found in practice owing to the necessary yieldability of these segments, that their posts should be considerably smaller than the holes in the bosses which receive them so as to permit the posts to work freely and not bind therein. Then again the two series of springs 17 and 21 are arranged to fit tightly over their respective bosses 12 and 13 both in the rim and the bosses 22 and 23 on the under side of the different segments, whereby a large portion of the torsional driving strain of the wheel will be carried by these springs and the posts simply serve to keep the bosses from creeping circularly out of their respective positions.

The operation of my improved tire may be more fully described as follows:—

The tire is made up primarily of two series of spring pressed segments one series overlapping those of the other, the whole being adapted to fit inside of an ordinary tire outer casing 11 which may be held in the usual way on the band 28 of the vehicle wheel by any suitable means such as a clamp ring 24 retained in position by a lock ring 25, all mounted on the usual felly 26 of the wheel 27 or by any other suitable means. When it is desired to place my improved mechanism within the tire casing I first apply a nut 18 to the threaded ends of the different posts 16 of the outer segments and by setting up on the same both series are drawn at the same time into the relative position illustrated in Fig. 2 in which figure the dotted lines represent the thickness of the tread of the tire casing. While contracted in this position the different sections of the rim 10 may be readily withdrawn from or positioned within the casing and after being so positioned, these nuts 18 may be unscrewed and removed from the ends of the posts and the segments are then permitted to expand to engage the inner surface of the casing. The whole tire is now placed upon the wheel rim and the locking rings positioned to hold the whole in place. As will be seen the springs of the different sections now support the load upon the tire as the same revolves which gives to the tire the resiliency and yieldability of the usual pneumatic tube without subjecting the user to the troubles which usually accompany such tires.

I claim:

1. An improvement in wheel tires comprising an annular rim provided with openings, a plurality of main tread segments having posts slidably engaging openings in said rim, supplemental tread-segments filling in and bridging the gaps between contiguous ends of the main tread-segments and having posts slidably engaging openings of said rim, springs interposed between the rim and the main and supplemental tread-segments, and means attached to the main tread sections for holding them in retracted position against the tension of their springs.

2. An improvement in wheel tires comprising an annular rim formed of segmental sections provided with hollow radial bosses, a plurality of main tread-segments having posts slidably engaging a plurality of said bosses, supplemental tread segments filling in and bridging the gaps between continuous ends of the main tread segments and having posts slidably engaging the remaining posts of said rim, springs interposed between the rim and the tread segments, and means attached to the main tread sections for holding them in retracted position against the tension of their springs.

3. An improvement in wheel tires comprising an annular rim of concavo-convex cross sections and provided with radial bosses on the concave side, said rim having recesses communicating with said bosses, a plurality of main tread segments concavo-convex in cross section and having posts on the concave sides slidably engaging a plurality of said bosses, supplemental tread segments of concavo-convex cross section filling in and bridging the gaps between contiguous ends of the main tread segments and having posts slidably engaging the remaining bosses, helical springs surounding the bosses and posts and interposed between the rim and the tread segments, and nuts engaging the posts of the main tread sections and working in said recesses whereby said nuts may hold the tread segments in retracted position against the tension of said springs.

In testimony whereof I affix my signature in presence of two witnesses.

WILLIAM T. CAREY.

Witnesses:
 HOWARD E. BARLOW,
 A. F. MACREADY.

Copies of this patent may be obtained for five cents each, by addressing the "Commissioner of Patents, Washington, D. C."